Nov. 14, 1944.  A. D. ROBBINS  2,362,930
POWER ASSISTED STEERING GEAR
Filed Sept. 15, 1943  2 Sheets-Sheet 1
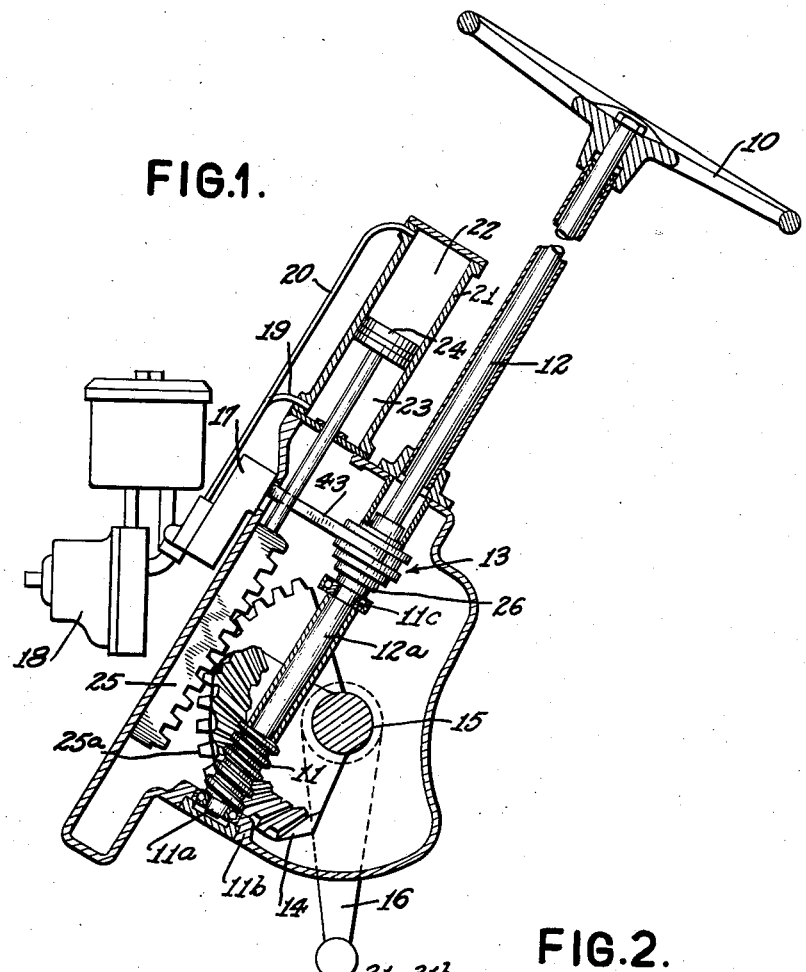
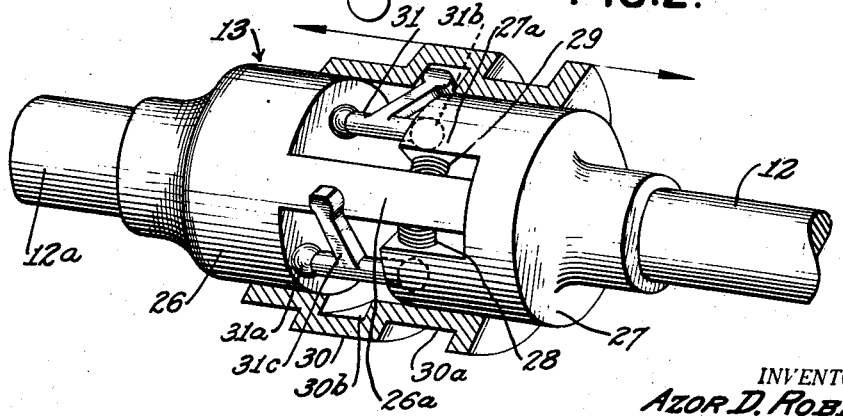
INVENTOR.
AZOR D. ROBBINS
BY
Hoguet, Neary & Campbell,
ATTORNEYS.

Patented Nov. 14, 1944

2,362,930

UNITED STATES PATENT OFFICE 2,362,930

POWER ASSISTED STEERING GEAR

Azor D. Robbins, Glen Cove, N. Y., assignor to Mack Manufacturing Corporation, Long Island City, N. Y., a corporation of Delaware Application September 15, 1943, Serial No. 502,421

4 Claims. (Cl. 180—79.2)

The present invention relates to steering mechanisms and embodies, more specifically, an improved steering mechanism by means of which the manual operation of the mechanism may be assisted by a suitable power-operated device under certain conditions.

The invention relates more particularly to steering mechanisms suitable especially for use on vehicles where the steering forces are such as to make it of considerable advantage to have available power-operated mechanism to assist in the manual operation of the steering mechanism when the required steering forces reach a predetermined amount.

Numerous power-operated steering mechanisms have heretofore been designed in which fluid or other power-operated means is utilized to accomplish the steering operations, such power-operated means being brought into play by movement of the steering column.

These previously designed mechanisms, while furnishing auxiliary power to accomplish the steering, have had certain objectionable characteristics, and an object of the present invention is to provide a steering mechanism in which means is provided for assisting the steering operation by a power-operated device, such power-assisting mechanism being brought into play by movement of the steering wheel and column under certain conditions.

A further object of the invention is to provide a steering mechanism of the above character in which the steering shaft does not partake of any axial movement, its motion being limited entirely to turning movement.

Yet another object of the invention is to provide a steering mechanism of the above character wherein normal manual operation is insured in the event of mechanical failure of the power-assisting mechanism.

Yet another object of the invention is to provide a steering mechanism of the above character wherein the steering mechanism is self-returning, thus to cause the vehicle to tend to straighten out when the steering wheel is freed after a turning operation.

A further object of the invention is to provide a steering mechanism of the above character wherein a steering gear is built as a unitary assembly and in such fashion that it may be conveniently assembled and serviced.

In connection with the foregoing objects and advantages, it will be observed that the invention provides a mechanism by means of which the steering control is located at a point where control is most valuable, that is, between the worm and steering wheel.

Details of the power-assisting mechanism and the control thereof will be apparent as the invention is described in connection with the accompanying drawings, wherein Fig. 1 is a view in side elevation showing a steering mechanism constructed in accordance with the present invention, the view illustrating certain parts of the steering mechanism in section to facilitate the study thereof;

Fig. 2 is a perspective view, partly broken away and in section, showing the structure of the control assembly elements of Fig. 1;

Figure 3:
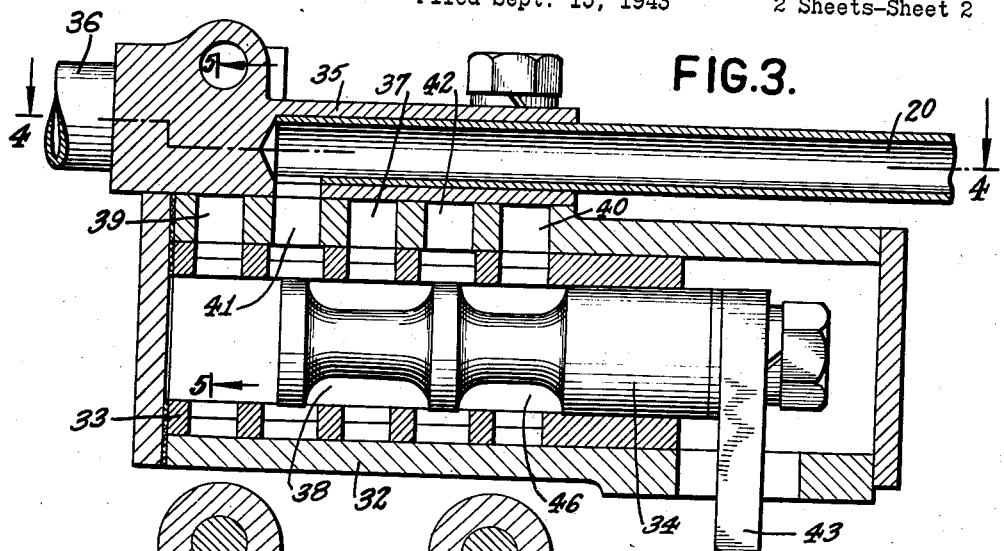
Fig. 3 is a view in section of the control valve shown in Fig. 1.

Referring to the above drawings, the steering wheel is shown at 10 as operating a worm 11 through a worm shaft 12 and 12a. The worm 11 is mounted directly on the shaft section 12a which is journalled at 11a in a suitable worm and sector housing 11b. The upper end of the shaft section 12a is journalled at 11c and has a jaw block 26 secured thereto, the details of the block being described hereinafter.

The lower end of the shaft section 12 is provided with a jaw block 27 mating with the jaw block 26 and forming a part of a control assembly illustrated generally at 13.

Within the housing 11b a worm sector 14 is provided, the sector being mounted upon a cross-shaft 15 having a steering arm 16 connected thereto. A control valve is provided on the housing 11b, the valve being illustrated generally at 17 in Fig. 1, fluid under pressure being supplied to the valve from a pump 18. Fluid pipes 19 and 20 supply fluid to either end of a cylinder 21 within which a piston 24 is provided. The cylinder 21 and piston 24 thus provide fluid chambers 22 and 23 with which the respective pipes 20 and 19 communicate.

The piston 24 is connected to a rod and rack 25 which engages with teeth 25a formed on the sector 14, thus enabling the sector 14 to be operated not only by the worm 11 but also by the power-operated rack 25.

Referring to Fig. 2, the control assembly is shown as being formed of a sleeve 30 having a peripheral groove 30a within which the fingers of a yoke 43 (Fig. 1) are received. Movement of the sleeve 30 in either direction, as indicated by the arrows in Fig. 2, will cause appropriate axial movement of the yoke 43, and thus axial movement of the sleeve is accomplished by the control assembly, depending upon the amount of turning force required to accomplish the steering motion. For example, the jaw block 26 is formed with an axially extending plate 26a which is received between the jaws 27a of the jaw block 27. Springs 28 and 29 are mounted between the jaws 26a and 27a to transmit the turning force of the shaft 12 to the shaft section 12a.

Bell crank levers 31 are pivoted at 31a in the jaw block 26 and at 31b in the jaws 27a and are provided with arms 31c which extend into a groove 30b, formed on the inner periphery of the sleeve 30.

From the foregoing it will be seen that the control assembly 13 provides a means by which steering forces may be transmitted directly from the shaft 12 to the shaft section 12a through the springs 28 and 29 and the jaw members 26 and 27. If the steering forces are sufficiently great, either of the springs 28 or 29 will be compressed, causing relative turning movement between the jaws 26a and 27a, thus causing pivotal movement of the bell crank levers 31 and a corresponding axial movement of the fingers 31a. This will cause the sleeve 30 to be moved axially in the appropriate direction, transmitting such axial forces to the yoke 17a. By suitably selecting the springs 28 and 29, the extent of axial movement of the sleeve 30 may be controlled as desired. In this fashion a certain desired range of turning forces may be secured, within which range the steering operations will be accomplished entirely manually. Beyond this range of forces, the power-assisting mechanism to be described previously will be brought into play.

Figure 4:
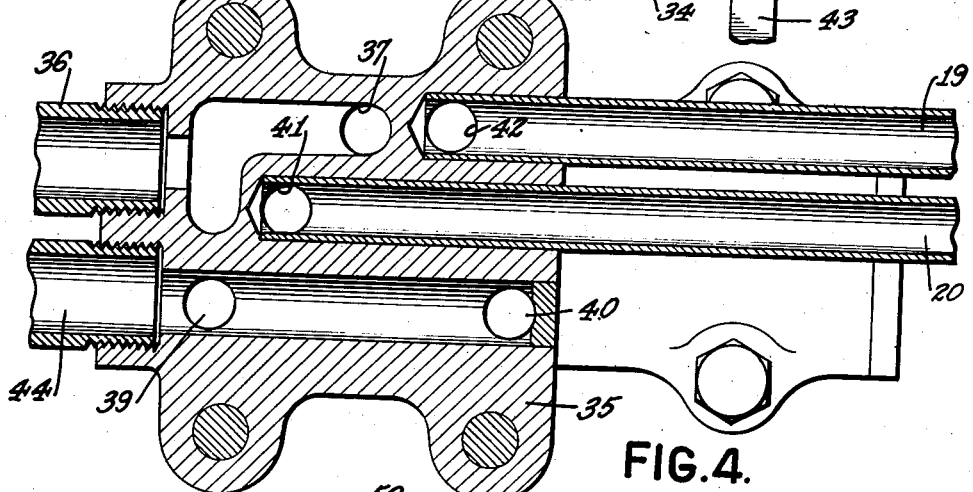
Fig. 4 is a view in section taken on the line 4—4 of Fig. 3 and looking in the direction of the arows.

The power-assisting mechanism previously referred to and including the rack 35 and piston 24 is controlled by means of a control valve 17 which is illustrated in greater detail in Figs. 3 and 4. The control valve will be seen to include a valve casing 32 having a valve sleeve 33 and a valve 34. A valve head or plate 35 is provided to supply a fluid under pressure to the valve mechanism and to deliver the controlled fluid to the pipes 19 and 20. Fluid under pressure is supplied from a pipe 36 to a port 37 and communicates with the center valve chamber 38. The valve 34 is also formed to provide a valve chamber 46. A pipe 44 serves as a return to carry the fluid back to the source of pressure.

In Fig. 3 the valve 34 is shown as being in a neutral position, at which time the pressure of the fluid at the pipe 36 and port 37 is distributed evenly to the openings 39, 40, 41, and 42 formed in the valve casing. In this position of the valve, fluid under pressure enters from port 37 into the chamber 38 and flows equally into ports 41 and 42 and also into ports 39 and 40. Free passage of the fluid is thus permitted with the valve 34 in the position shown in Fig. 3 and the power-assisting mechanism remains dormant.

The mechanism comes into play upon the application of sufficient resistance to the turning of shaft 12, this resistance being set up by the shaft section 12a and related steering elements. Upon such resistance coming into existence, the jaw member 26 will oppose the free motion of the control assembly shown in Fig. 2 and there will be a relative rotation between the jaw members 26 and 27 which will set up a corresponding movement in the bell cranks 31. Upon movement of the fingers 31c, the control sleeve 30 moves axially to cause the yoke 43 to move the valve 34 in the appropriate direction. The resulting displacement of the valve 34 to the right or left causes power to be applied to the rack 25 in the following manner:

For example, if the valve 34 is displaced to the left, as viewed in Fig. 3, the passage to the duct 41 becomes larger and the passage to the duct 43 correspondingly smaller. Simultaneously, the passage to the valve chamber 46 from the port 42 becomes larger, permitting easier scavenging of the fluid in the inactive side of the power cylinder. Also, with the enlargement of the passage between the ports 37 and 41, the passage to the port 39 becomes smaller. In this fashion most of the fluid under pressure is supplied to the duct 41 and thus to the power cylinder 21 through the pipe 20. This fluid enters the chamber 22 and is applied to the upper side of the piston 24, thus causing the rack 25 to provide assisting power to the sector 14 through the teeth 25a. The fluid in chamber 23 is forced out through the pipe 19, port 42, valve chamber 46, and port 40 to the return pipe 44.

Relative movement between the shaft 12 and shaft section 12a in the opposite direction causes a reversal of movement of the valve 34 and a corresponding flow of fluid to the chamber 23 instead of the chamber 22. As previously stated, when the resistance to steering is low, the jaw members 26 and 27 rotate in unison if the springs 28 and 29 are properly selected. When this is done, the bell crank levers are not moved pivotally and the control sleeve is not shifted axially so that there is no valve motion and no power assistance to the steering operation. As soon as the resistance to steering increases sufficiently, the springs yield and there is a relative motion between the jaw members which is transmitted to the valve member 34 to provide steering assistance.

Figure 5:
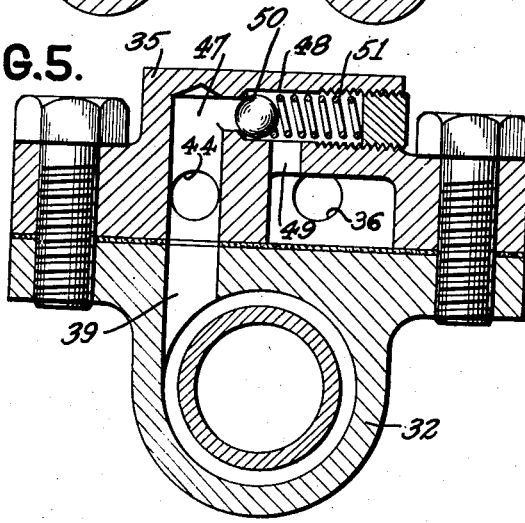
Fig. 5 is a view in section taken on line 5—5 of Fig. 3 and looking in the direction of the arrows.

As shown in Fig. 5, the valve plate 35 is formed with a passage 47 communicating through a vault chamber 48 with a passage 49 that communicates with the pipe 36. The passage 47 communicates with the return pipe 27 and a ball 50 is seated in the ball chamber 48 by means of a light spring 51. This mechanism provides a relief valve to allow a free interchange of the power fluid between the high and low pressure sides of the system in the event of failure of pressure from the fluid system. Under this condition the steering gear operates as a normal steering gear and without any power assistance.

From the foregoing it will be seen that a steering gear has been provided wherein the steering gear is free to rotate but does not partake of any axial movement. The only axially movable element is the control sleeve and valve, and the steering control is placed between the worm and the steering wheel, thus utilizing the most effective location for a control mechanism. As previously stated, the steering gear is capable of operating as a manually operated steering mechanism in event of failure of the pressure system and, due to the free communication between all of the passageways when no power is delivered, the steering mechanism is self-returning. Moreover, the steering mechanism is formed as a single unit and is thus readily constructed and assembled in operating position.

While the invention has been described in reference to the accompanying drawings, it is not to be limited save as defined in the appended claims.

I claim:

1. Steering mechanism comprising a steering shaft, a steering arm, a shaft section coaxial with the shaft and connected to operate the arm, a connection between the shaft and shaft section to permit a limited relative rotary motion therebetween, a bell crank lever pivoted to the shaft and to the shaft section and movable in response to relative movement of said shaft and said shaft section, a crank arm on the lever, a sleeve connected to said crank arm and slidable axially with respect to the shaft and shaft section upon movement of said lever, and power means responsive to movement of the sleeve to apply power to the arm.

2. Steering mechanism comprising a steering shaft, a steering arm, a shaft section coaxial with the shaft and connected to operate the arm, a connection between the shaft and shaft section to permit a limited relative rotary motion therebetween, means to resist, yieldingly, said relative rotary motion, a bell crank lever pivoted to the shaft and to the shaft section, a crank arm on the lever, a sleeve slidable axially with respect to the shaft and shaft section, means to operate the sleeve by the crank arm, and power means responsive to movement of the sleeve to apply power to the arm.

3. Steering mechanism comprising a steering shaft, a steering arm, a shaft section coaxial with the shaft and connected to operate the arm, jaw members on the shaft and shaft section, plates on the jaw members, one of said plates on one of said members extending between plates on the other of said jaw members, springs between the plates to resist, yieldingly, relative movement therebetween, a bell crank lever pivoted to each of said plates between relatively moving surfaces thereof, a crank arm on the bell crank member, a sleeve slidable axially on the jaw members and formed with a groove on the inner periphery thereof to receive the crank arm, and power means responsive to movement of the sleeve to apply power to the arm.

4. Steering mechanism comprising a steering shaft, a steering arm, a shaft section coaxial with the shaft and connected to operate the arm, a connection between the shaft and shaft section to permit a limited relative rotary motion therebetween, a bell crank lever pivoted to the shaft and to the shaft section, a crank arm on the lever, a sleeve slidable axially with respect to the shaft and shaft section, means to operate the sleeve by the crank arm, a source of fluid under pressure, a cylinder, connections between the cylinder and arm for applying power to the arm, valve means, conduits between valve means and the fluid source and cylinder, a valve sleeve in the valve means having ports communicating with the conduits, a valve slidable in the valve sleeve, and means to operate the valve by the first-named sleeve.

AZOR D. ROBBINS.